United States Patent [19]

Würth et al.

[11] 4,448,055
[45] May 15, 1984

[54] METHOD TO MANUFACTURE POLE PIECES FOR DYNAMO ELECTRIC MACHINE, AND SO-MADE POLE PIECE

[75] Inventors: Hans Würth, Ludwigsburg; Jürgen Leinhos, Göttingen, both of Fed. Rep. of Germany

[73] Assignee: Robert Bosch GmbH, Stuttgart, Fed. Rep. of Germany

[21] Appl. No.: 408,192

[22] Filed: Aug. 16, 1982

Related U.S. Application Data

[63] Continuation of Ser. No. 165,556, Jul. 3, 1980, abandoned.

[30] Foreign Application Priority Data

Aug. 31, 1979 [DE] Fed. Rep. of Germany ....... 2935182

[51] Int. Cl.³ .............................................. B21D 22/00
[52] U.S. Cl. .......................................... 72/354; 72/334
[58] Field of Search ................. 72/334, 336, 267, 352, 72/353, 354, 356

[56] References Cited

U.S. PATENT DOCUMENTS

| | | | |
|---|---|---|---|
| 2,104,222 | 1/1938 | Decker | 72/267 X |
| 2,755,543 | 7/1956 | Dunn et al. | 72/267 X |
| 3,124,876 | 3/1964 | Puetti | 72/334 |

*Primary Examiner*—Leon Gilden
*Attorney, Agent, or Firm*—Frishauf, Holtz, Goodman & Woodward

[57] ABSTRACT

A blank 1 is removed from a strip of material 2 and placed in a die against which a lower punch and an upper punch are operable. In one step, by moving of the lower punch upwardly, shaped to form the pole core or pole piece, and the upper punch against the blank in the die, the pole piece, pole shoes, and outer pole radii at the end portions are formed. If desired, the pole can be perforated and the perforation formed with a thread, and accurately sized in the subsequent cutting and sizing step.

5 Claims, 4 Drawing Figures

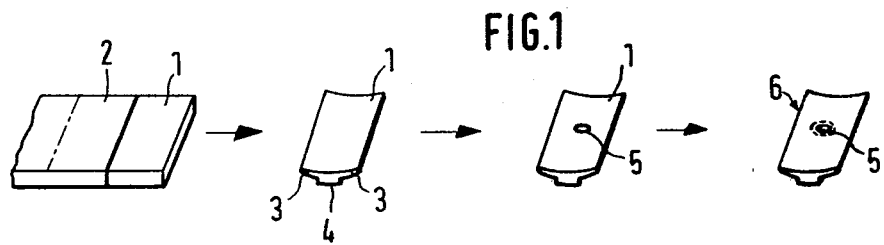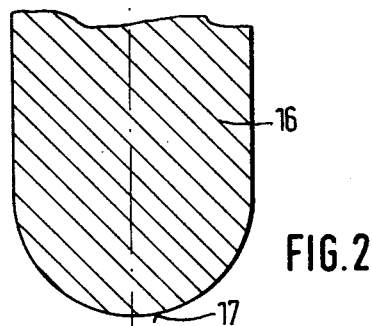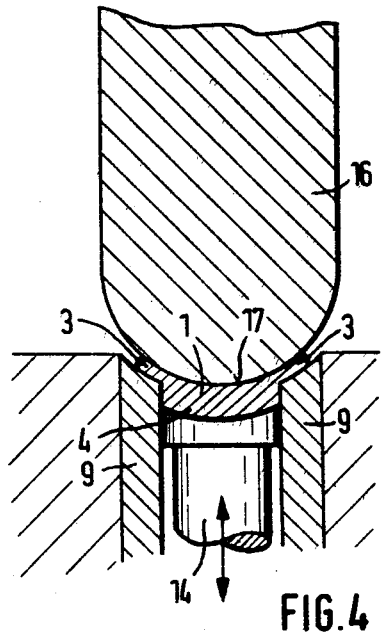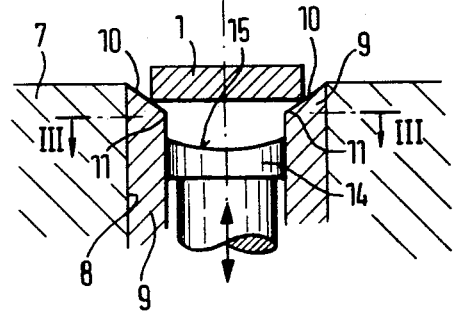

METHOD TO MANUFACTURE POLE PIECES FOR DYNAMO ELECTRIC MACHINE, AND SO-MADE POLE PIECE

This is a continuation of application Ser. No. 165,556 filed July 3, 1980, now abandoned.

The present invention relates to a method to manufacture pole pieces for dynamo electric machines, and the resulting pole pieces so made, and more particularly to such pole pieces for use in starters for automotive applications.

BACKGROUND AND PRIOR ART

Pole pieces for dynamo electric machines, and particularly for small dynamo electric machines of the fractional horsepower type, have been made by deforming a blank to make a main pole, and then shape four sides pole shoes or end pieces. This type of manufacture requires subsequent cutting or shearing to shape the outer contour of the pole pieces. Manufacture of such pole pieces requires multiple manufacturing steps, and during these manufacturing steps, scrap material is the inevitable result of the manufacturing process. The pole pieces, since they are to have a cylindrical contour to fit around the outer contour of a rotor, with the air gap interposed have to be shaped separatedly in order to obtain the cylindrical surface.

THE INVENTION

It is an object to provide an economical method of making pole pieces from blanks essentially without scrap or waste, in which the working step requirements are reduced and, because of the absence of scrap, the overall material requirements for each one of the pole pieces likewise is reduced.

Briefly, a flat strip of material is initially provided, for example rolled off a roll. Blanks are separated from the flat strip, in a direction transverse to the longitudinal extent of the strip, the blanks being essentially rectangular. These blanks are introduced into a mold forming press which has a die with a recess formed with inclined edges. The longitudinal edges of the essentially rectangular blank are placed on this die. The cold-forming press includes a lower punch element movable in the recess of the die. The lower punch element is shaped to provide a matching surface of one side of the pole piece. An upper punch element is provided movable towards the die and formed with an outwardly bulging convex circumference matching the obverse side of the pole piece, that is, the cylindrical surface portion thereof which, in installation in a dynamo electric machine, is to face a cylindrical rotor with the air gap therebetween. The upper and the lower punch elements are moved towards each other, so that the pole piece will be formed in one step or punching operation. Movement of the punch element will form, in one step, the pole shoe ends by engagement of the blank with the inclined edges of the die, the pole core is formed, as well as the rounded surface of the pole face. No waste will result in the shaping operation. If desired, the pole piece can subsequently be provided with an aperture, for example centrally located, to attach the pole shoe to a frame or the like. The subsequent manufacturing step also may include a final shaping, that is, finally sizing the pole piece.

The so made pole piece thus is a single unitary integrally formed cold-drawn element, shaped from a blank, i.e. without any further severing operation after the blank itself has been severed from a continuous strip of supply material.

The method of making this pole piece has the advantage with respect to prior art methods that no waste will result, and the pole is made in one single manufacturing step by cold-working of the blank. The pole shoes and pole end pieces are simultaneously formed with shaping of the pole core and, further, the bowing or curvature which is required of the pole is likewise imparted to it in the same manufacturing step. The method, by utilizing a die with upper and lower punch elements working thereagainst, requires less energy and less forming force than prior art methods.

Drawings:

FIG. 1 shows, sequentially, in highly schematic representation, the respective steps being carried out by the method;

FIG. 2 is a vertical, highly schematic cross-sectional view through a die and the respective punch elements cooperating therewith, and showing a blank inserted in the die;

FIG. 3 is a top view of the die in section, taken along the line III—III of FIG. 2; and FIG. 4 is a view similar to FIG. 2 and illustrating shaping of the pole piece, that is, with the punch elements engaged at the end of the forming stroke as the pole piece is formed by cold-working the blank.

The poles for dynamo electric machines are made from blanks, without any waste. Blanks 1 (FIG. 1) are severed from a supply strip 2, of predetermined thickness corresponding to the thickness of the cores of the finished poles, which can be supplied in the form of longitudinal strips, rolled off a supply roll, or the like. The blanks 1 are then placed in a die where, in one step, the pole shoes 3 are formed and pole core 4 is shaped (FIG. 1). In a subsequent working step, an attachment hole 5 is formed and, if necessary, the pole piece is subjected to an additional pressing step to provide the final desired size of the pole piece. A thread is cut into the hole 5 of the finished pole 6.

The die and punch to carry out the method is illustrated in detail in FIG. 2. A holder or die plate 7 has an essentially rectangular hole 8 therethrough. Two shearing knives 9 are set into the opening 8. The shearing knives 9 have an inclined edge 10 which tapers inwardly toward a central well, and which has the shape of the back side of the pole shoes 3. The shearing edges 11 of the respective pole shoes are drawn forward at the terminal regions to shape the end pieces as shown by the curved portions 12 (FIG. 3) so that the end pieces of the pole will not have sharp corners. A lower punch element 14 with a concave punch surface 15 is movable within the opening 8 or, rather, within the surface of the well defined by the shear knives 9, respectively (FIGS. 2, 4). The lower punch element 14, movable upwardly, simultaneously acts as a throw-out element when the blank 1 has been shaped to become a pole element 6, that is, by overtravel of the punch 14 in the upward direction of the double arrow, the blank, after shaping, is removed from the die. The surface 15 of the lower punch 14 has the shape of the poles in final form. An upper punch element 16 having a convex punching surface 17 is movable downwardly towards the die. The convex surface 17 has a radius of curvature which corresponds to the curvature of the pole 6 (FIG. 1).

Method and operation of the die: The blank 1 is so placed in the die that its longitudinal edges come to lie on the inclined surfaces 10 of the shear knives 9 (see FIG. 2). The shear knives 9 have the length of the poles 6 to be formed from the blank 1. They extend slightly beyond the longitudinal edges of the blank 1, as best seen in FIG. 3, where the blank 1 is shown in chain-dotted lines for comparison with the opening defined by the shear knives 9. Upon depression of the upper punch 16, the blank 1 is pressed on the inclined surfaces 10 of the knives 9. The edges 11 penetrate into side edge portions of the blank 1. The material displaced between the edges 11 and the longitudinal edges of the blank 1 flows between the surfaces 10 and the upper punch surface 17 towards an outward direction to form the pole shoes 3. The inwardly drawn edges of the knives 9 force material from the blank of the pole core 4 between the knives 9 towards the surface 15 of the lower punch 14. Lower punch 14, upon upward movement, will shape the pole to form the respective lower curved surface configuration of portion 4, curved as desired— see surface 15 on the punch 14—while simultaneously forming the outer edges of the pole shoes with the respective curvature 12 (FIG. 3). The thickness of the blank is not changed in the region of the core portion 4, compare FIGS. 2 and 4, and see FIG. 1.

Toward the end of the operating cycle, the upper punch 16 will have the position shown in FIG. 4. The blank 1 already has the pole shoes 3 formed therein and, simultaneously, has the curvature of the entire pole element 6 formed at the side facing the rotor of a cylindrical air gap rotor machine. In a terminal portion of the cycle, the upper punch 16 is released to its starting position—FIG. 2—and the lower punch 14, acting as a throw-out or removal element, is raised even more to force the now shaped pole element 6 out of the die.

The so formed pole, which can be used as such, then has an attachment hole 5 formed therein, for example by punching, drilling, or the like. If necessary, the pole core 4 is pressed to a final height, i.e. the entire element may be subjected to a subsequent pressing step for perfect sizing. Additionally, a thread can be cut into the hole 5. The resulting pole 6 thus has been integrally cold-formed or cold-worked, i.e. shaped without a cutting, metal removing operation.

The blank 1 has been cold-worked to form the pole 6. The shaping forces are comparatively low thus, the blank 1 can have a cross-sectional thickness which approximates that of core 4, so that only shaping of the outer surface of core 4, forming the pole pieces 5, and shaping of their inner surface is needed (compare FIGS. 2 and 4) so that the method is suitable for economic application to large-quantity serial production, to make pole pieces 6 in a single working step. The previously believed necessary shearing of the outer surfaces of the pole, to accurately size the pole shoes and the end radii shown at 12 in FIG. 3, and resulting in material removal, and hence waste, are avoided.

We claim:

1. Method of economical and waste-free manufacture of pole pieces (6) having a central pole core (4) and projecting pole shoes (3) integral with the central pole core and of less thickness than the core, for use in dynamo electric machines having an air gap, comprising
providing a flat strip of material of a predetermined thickness corresponding to the thickness of the pole core (4);
severing essentially rectangular blanks (1) from the strip;
providing a cold-forming press (9, 14, 16) having
a die formed with a recess which has inclined edges (10) of the shape of the pole shoes (3);
and a central well, the junction of the inclined edges (10) and of the surfaces of the well-forming shearing edges (11);
a lower punch element (14) movable in the well and shaped to match the surface configuration of the pole core of the pole piece (6), and
an upper punch element (16) formed with an outwardly bulging surface (17) matching the surface configuration of the side of the pole piece (6) facing the air gap;
and including the steps of
positioning the essentially rectangular blank (1) on the inclined edges (10) of the die;
moving said upper and lower punch elements towards each other and engaging said punch elements with the blanks to shape, in one operation, the central pole core (4) and form the projecting pole shoes (3) without cutting waste, the step of forming the pole shoes (3) comprising
engagement of the blank with the inclined edge (10) of the die, and, upon contact of the blank with the shearing edges (11), and pressure of said upper punch element (16), the shearing edges shearing two side edge portions of the blank and flow forming the poles shoes (3) only by cutting into the blank to form the pole shoes as cut flaps of reduced thickness with respect to the thickness of the blank;
and the step of
shaping the surface configuration of the pole core comprising
moving the lower punch element (14) in the well to shape the surface configuration of the pole core (4) while maintaining said predetermined thickness of the pole core.

2. Method according to claim 1, wherein the die has curved terminal portions extending slightly beyond the rectangular outline of the blank to provide outer pole radii during the step of movement of the upper and lower punch elements towards each other and forming of the pole piece in said one operation.

3. Method according to claim 1, including the step of moving the lower punch element beyond the punch position after withdrawal of the upper punch element to eject and remove the shaped pole from the die.

4. Method according to claim 1, further including the step of perforating the pole (6) and sizing the pole to its final height or thickness in a subsequent pressing step.

5. Method according to claim 1, including the step of rounding the face of the pole piece and the pole shoes to form the pole core and pole shoes in the shape of the air gap in the same step as the forming of the pole shoes is carried out.

* * * * *